US009546307B2

(12) United States Patent
Krishnan et al.

(10) Patent No.: US 9,546,307 B2
(45) Date of Patent: Jan. 17, 2017

(54) POLYURETHANE BASED INSULATED GLASS SEALANT

(71) Applicant: Dow Global Technologies LLC, Midland, MI (US)

(72) Inventors: Bindu Krishnan, Lake Jackson, TX (US); Dwight Latham, Clute, TX (US); Laura A. Grier, Brazoria, TX (US); Woo-Sung Bae, Midland, MI (US); Hector Perez, Angleton, TX (US); Jorge Jimenez, Lake Jackson, TX (US); William A. Koonce, Pearland, TX (US)

( * ) Notice: Subject to any disclaimer, the term of this patent is extended or adjusted under 35 U.S.C. 154(b) by 7 days.

(21) Appl. No.: 14/423,261

(22) PCT Filed: Sep. 26, 2012

(86) PCT No.: PCT/US2012/057281
§ 371 (c)(1),
(2) Date: Feb. 23, 2015

(87) PCT Pub. No.: WO2014/051569
PCT Pub. Date: Apr. 3, 2014

(65) Prior Publication Data
US 2015/0218428 A1  Aug. 6, 2015

(51) Int. Cl.
| | |
|---|---|
| C09J 175/06 | (2006.01) |
| C08K 5/12 | (2006.01) |
| C08K 3/26 | (2006.01) |
| C03C 27/10 | (2006.01) |
| C08G 18/66 | (2006.01) |
| C08G 18/79 | (2006.01) |
| C08G 18/40 | (2006.01) |
| C08G 18/42 | (2006.01) |
| C09K 3/10 | (2006.01) |
| C08K 5/11 | (2006.01) |

(52) U.S. Cl.
CPC .............. *C09J 175/06* (2013.01); *C03C 27/10* (2013.01); *C08G 18/4018* (2013.01); *C08G 18/4241* (2013.01); *C08G 18/4283* (2013.01); *C08G 18/4286* (2013.01); *C08G 18/4288* (2013.01); *C08G 18/664* (2013.01); *C08G 18/797* (2013.01); *C08K 3/26* (2013.01); *C08K 5/11* (2013.01); *C08K 5/12* (2013.01); *C09K 3/1021* (2013.01); *C08G 2190/00* (2013.01); *C08K 2003/265* (2013.01); *Y10T 428/31551* (2015.04)

(58) Field of Classification Search
CPC .... C03C 27/10; C08J 18/4018; C08J 18/4241; C08J 18/4283; C08J 18/4286; C08J 18/4288; C08J 18/664; C08J 18/797; C08J 2190/00; C08K 2003/265; C08K 3/26; C08K 5/11; C08K 5/12; C09J 175/06; C09K 3/1021; Y10T 428/31551; Y10T 428/31601
USPC .......................................... 428/425.6; 528/60
See application file for complete search history.

(56) References Cited

U.S. PATENT DOCUMENTS

| | | | |
|---|---|---|---|
| 4,633,021 A | 12/1986 | Hanes | |
| 4,731,486 A | 3/1988 | Abatjoglou et al. | |
| 5,623,044 A | 4/1997 | Chiao | |
| 5,849,832 A | 12/1998 | Virnelson et al. | |
| 6,355,317 B1 | 3/2002 | Reid et al. | |
| 6,383,324 B1 | 5/2002 | Vietti et al. | |
| 8,404,086 B2 | 3/2013 | Frycek et al. | |
| 8,758,861 B2 | 6/2014 | Hudson et al. | |
| 2004/0143034 A1* | 7/2004 | Primke et al. | 523/176 |
| 2004/0180155 A1 | 9/2004 | Nguyen-Misra et al. | |
| 2004/0181007 A1 | 9/2004 | Acevedo et al. | |
| 2006/0193802 A1 | 8/2006 | Lysenko et al. | |
| 2007/0083027 A1 | 4/2007 | Fukuda et al. | |
| 2007/0178256 A1 | 8/2007 | Landon | |
| 2010/0216905 A1* | 8/2010 | Kuwamura et al. | 521/170 |
| 2010/0255224 A1 | 10/2010 | Gubbels et al. | |
| 2011/0048509 A1 | 3/2011 | Becker et al. | |

FOREIGN PATENT DOCUMENTS

| | | |
|---|---|---|
| DE | 19625845 A1 | 1/1998 |
| EP | 1837354 A1 | 9/2007 |
| JP | 2003193031 A | 7/2003 |
| JP | 2008031197 A | 2/2008 |

OTHER PUBLICATIONS

PCT/US2012/057281 International Search Report and Written Opinion of the International Searching Authority Mailed Mar. 22, 2013.
PCT/US2012/057281 International Preliminary Report on Patentability, Mar. 31, 2015.
Dow Global Technologies LLC, Russian Office Action Dated Jun. 17, 2015.
Dow Global Technologies LLC, Response to Russian Office Action Dated Aug. 17, 2015.

* cited by examiner

*Primary Examiner* — Thao T Tran

(57) ABSTRACT

Embodiments of the invention provide for polyurethane-based sealants. The sealants include a reaction product of a reaction system which includes at least one isocyanate, and at least one polyester polyol. The polyester polyol includes a reaction product of a polyester reaction mixture which includes one or more hydrophobic monomers, one or more organic diacids or methyl esters thereof, and one or more diols.

11 Claims, No Drawings

POLYURETHANE BASED INSULATED GLASS SEALANT

FIELD OF THE INVENTION

Embodiments of the invention relate insulated glass units, more specifically to insulated glass units having polyurethane based seals.

BACKGROUND OF THE INVENTION

Insulating (or insulated) glass (IG) units comprise two parallel sheets of glass held apart by spacer bars. The cavity formed between the sheets of glass is filled with inert gas to help reduce heat and sound transmission. Typically two different types of sealants are used to join the glass to the spacer bars. The innermost or the primary sealant joins the space bars to the glass sheets, and serves as a barrier against escape or egress of the inert gas from the cavity as well as a barrier against the entry or ingress of moisture vapor into the cavity. Thermoplastic polyisobutylene is one common primary sealant. However this material lacks mechanical strength and it exhibits comparably less adhesion than the outermost or secondary sealant. As such, one function of the secondary sealant is to provide mechanical strength to the unit and to prevent rupture of the primary sealant during the natural thermal cycles to which the unit is exposed.

Because of its good mechanical properties, polyurethane, particularly polyurethane that is based on a hydrophobic polybutadiene-based polyol, is a commonly used secondary sealant. However, such polyurethanes may not have optimal weatherability and gas retention properties. Therefore, there is a need for polyurethane based sealants that have enhanced weatherability and gas retention properties.

SUMMARY OF THE INVENTION

Embodiments of the invention relate to polyurethane based glass sealants that have enhanced weatherability and gas retention properties.

Embodiments encompass polyurethane-based sealants which include a reaction product of a reaction system which includes at least one isocyanate and at least one polyester polyol. The polyester polyol includes a reaction product of a polyester reaction mixture which includes one or more hydrophobic monomers, one or more organic diacids or methyl esters thereof, and one or more diols having a molecular weight between about 62 g/mol and about 1000 g/mol.

The disclosed polyurethane-based sealants may include one or more of the following aspects:

The polyester reaction mixture including one or more polyols having a functionality of at least 3 and a molecular weight below about 400 g/mol.

The reaction system further including at least one chain extender having two isocyanate-reactive groups per molecule and an equivalent weight per isocyanate-reactive group of less than 400.

The reaction system further including at least one filler, wherein the at least one filler is at least one of barium sulfate (BaSO4), aluminum oxide (Al2O3), aluminum hydroxide (Al(OH)3), magnesium hydroxide (Mg(OH)2) calcium carbonate (CaCO3), mica, and talc.

The reaction system further including at least one plasticizer.

The reaction system further including at least one adhesion promoter.

The reaction system further including at least one catalyst.

The one or more hydrophobic monomers including at least one of one or more dimer acids, dimer diols, fatty acids or esters thereof having a fatty acid chain and at least one of an OH, CH3OH, COOH, or CH3COOH group attached to the fatty acid chain, or combinations thereof.

The one or more organic diacids including linear or branched compounds represented by HOOZ—X—ZOOH, where X includes aliphatic linkages, aromatic linkages, or mixtures thereof, of between 2 carbons and twenty 20 carbons, and Z is selected from carbon, phosphorous, sulfur.

The one or more organic diacids are selected from phthalic acid, isophthalic acid, terephthalic acid, trimellitic acid, tetrahydrophthalic acid, hexahydrophthalic acid, tetrachlorophthalic acid, oxalic acid, adipic acid, azelaic acid, sebacic acid, succinic acid, malic acid, glutaric acid, malonic acid, pimelic acid, suberic acid, 2,2-dimethylsuccinic acid, 3,3-dimethylglutaric acid, 2,2-dimethylglutaric acid, maleic acid, fumaric acid, itaconic acid, fatty acids, or combinations thereof.

The one or more diols is selected from ethylene glycol, propylene glycol, 1,2-butylene glycol, 2,3-butylene glycol, 1,3-propanediol, 1,3-butanediol, 1,4-butanediol, 1,6-hexanediol, neopentylglycol, 1,2-ethylhexyldiol, 1,5-pentanediol, 1,10-decanediol, 1,3-cyclohexanedimethanol, 1,4-cyclohexanedimethanol (CHDM), or combinations thereof The one or more organic diacids include adipic acid and the one more diols having molecular weight between about 62 g/mol and about 1000 g/mol comprises at least one of 1,4-butanediol and 1,6 hexanediol.

The one or more hydrophobic monomers includes 12-hydroxystearic acid.

The one or more polyols having a functionality of at least 3 and a molecular weight below about 400 g/mol comprises glycerin.

Embodiments also include insulated units, which may include a first surface, the polyurethane-based sealant described herein disposed on at least portions of the first surface, and a second surface disposed on the polyurethane-based sealant.

DESCRIPTION OF EMBODIMENTS OF THE INVENTION

Embodiments of the invention provide for methods producing sealants that have enhanced weatherability and gas retention properties while at the same time maintaining the sealants' physical, structural, and mechanical properties. Embodiments of the sealants encompass two-component polyurethane systems where a first component includes at least one polyester polyol and is reacted with a second component which includes at least one polyisocyanate. The first component and the second component and are mixed and applied to a base material to be cured.

The first component (also called an isocyanate reactive side) includes at least one polyester polyol having a number average molecular weight which is within a range from about 500 to about 4,000 or from within a range from about 1,000 to about 3,800. Between about 10 and about 90 weight % of the first component may include the at least one polyol. All individual values and subranges between about 10 and about 90 weight % are included herein and disclosed herein; for example, the amount can be from a lower limit of about 10, 15, 20, 25, 30, 35, 40, 45, 50, 55, 60, 65, 70, 75, or 80 weight % to an upper limit of about 20, 25, 30, 35, 40, 45, 50, 55, 60, 65, 70, 75, 80, 85, or 90 weight %.

The polyester polyols may be the reaction product of a polyester reaction mixture which includes at least (i) one or more hydrophobic monomers (ii) one or more organic diacids or methyl esters thereof, and (iii) one or more diols.

The hydrophobic monomers may include at least one of one or more dimer acids, dimer diols, fatty acids or esters thereof having a fatty acid chain and at least one of an OH, $CH_3OH$, COOH, or $CH_3COOH$ group attached to the fatty acid chain, or combinations thereof.

The one or more dimer acids may include dimer acids containing from about 18 to about 44 carbon atoms. Dimer acids (and esters thereof) are a well known commercially available class of dicarboxylic acids (or esters). They are normally prepared by dimerizing unsaturated long chain aliphatic monocarboxylic acids, usually of 13 to 22 carbon atoms, or their esters (alkyl esters). Not to be bound by theory but it is believed that the dimerization is thought to proceed by possible mechanisms which include Diels Alder, free radical, and carbonium ion mechanisms. The dimer acid material will usually contain 26 to 44 carbon atoms. Particularly, examples include dimer acids (or esters) derived from $C_{18}$ and $C_{22}$ unsaturated monocarboxylic acids (or esters) which will yield, respectively, $C_{36}$ and $C_{44}$ dimer acids (or esters). Dimer acids derived from $C_{18}$ unsaturated acids, which include acids such as linoleic and linolenic are particularly well known (yielding $C_{36}$ dimer acids). For example, DELTA 9, 11 and DELTA 9, 12 linoleic acids can dimerize to a cyclic unsaturated structure (although this is only one possible structure; other structures, including acyclic structures are also possible). The dimer acid products may also contain a proportion of trimer acids ($C_{54}$ acids when using $C_{18}$ starting acids), possibly even higher oligomers and also small amounts of the monomer acids. Several different grades of dimer acids are available from commercial sources and these differ from each other primarily in the amount of monobasic and trimer acid fractions and the degree of unsaturation. The various dimers may be selected from crude grade dimer acids, hydrogenated dimer acids, purified/hydrogenated dimer acids, and combinations thereof.

Exemplary dimer acids are available from Croda under the tradename PRIPOL™ acids and from Cognis under the tradename EMPOL® acids. Suitable commercially available products of that type include PRIPOL™ 1017 (C36 dimer fatty acid), PRIPOL™ 1013 (C36 distilled dimer fatty acid), and PRIPOL™ 1006 (hydrogenated C36 dimer fatty acid).

The dimer diols may include dimer acids which have been reduced to the corresponding dimer diols. Exemplary dimer diols are available from Croda under the tradename PRIPOL™ diols. Suitable commercially available products of that type include PRIPOL™ 2030 and PRIPOL™ 2033.

The fatty acids or esters thereof having a fatty acid chain and at least one of an OH, $CH_3OH$, or $CH_3COOH$ group attached to the fatty acid chain may be based on or derived from renewable feedstock resources such as natural and/or genetically modified plant vegetable seed oils and/or animal source fats. Examples of suitable fatty acids or esters thereof include hydroxyl stearic acids or esters thereof and hydroxymethylated fatty acids or esters thereof.

The hydroxyl stearic acid may include 12 hydroxy stearic acid (12-HSA). Saturated monobasic secondary hydroxy fatty acids, especially 12-HSA, are commercially available.

Suitable hydroxymethylated fatty acids or esters thereof may be obtained through hydroformylation and hydrogenation methods such as described in U.S. Pat. Nos. 4,731,486 and 4,633,021, for example, and in U.S. Published Patent Application No. 2006/0193802.

In one embodiment the one or more hydroxymethylated fatty acids or esters thereof is a monol-rich monomer. "Monol-rich monomer" and like terms means a composition comprising at least 50, typically at least 75 and more typically at least 85, weight percent (wt. %) mono-hydroxy functional fatty acid alkyl ester such as, but not limited to, that of formula I:

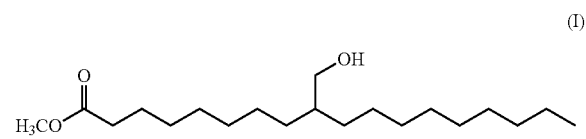

(I)

The length of the carbon backbone of formula I can vary, e.g., $C_{12}$-$C_{20}$, but it is typically $C_{18}$, as can the placement of the hydroxymethyl group along its length. The monol-rich monomer used in the practice of this invention can comprise a mixture of mono-hydroxy functional fatty acid alkyl esters varying in both carbon backbone length and hydroxy group placement along the length of the various carbon backbones. The monomer can also be an alkyl ester other than methyl, e.g., a $C_2$-$C_8$ alkyl ester. Other components of the composition include, but are not limited to, poly (e.g., di-, tri-, tetra-, etc.) hydroxy functional fatty acid alkyl esters.

The source of the monol-rich monomer can vary widely and includes, but is not limited to, high oleic feedstock or distillation of a low oleic feedstock, e.g., a natural seed oil such as soy as, for example, disclosed in co-pending application "PURIFICATION OF HYDROFORMYLATED AND HYDROGENATED FATTY ALKYL ESTER COMPOSITIONS" by George Frycek, Shawn Feist, Zenon Lysenko, Bruce Pynnonen and Tim Frank, filed Jun. 20, 2008, application number PCT/US08/67585, published as WO 2009/009271.

The monol-rich monomer may be derived by first hydroformylating and hydrogenating the fatty alkyl esters or acids, followed by purification to obtain monol rich monomer. Alternatively, the fatty alkyl esters or acids may first be purified to obtain mono-unsaturated rich monomer and then hydroformylated and hydrogenated.

The $CH_3OH$ group attached to the fatty acid chain may optionally be oxidized to $CH_3COOH$.

The at least one hydrophobic monomer (i) may comprise at least 5 wt. %, 10 wt. %, 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, or 75 wt. % of the polyester reaction mixture. The at least one hydrophobic monomer (i) may comprise up to 10 wt. %, 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, or 80 wt. % of the polyester reaction mixture.

The polyester reaction mixture includes one of more organic diacids (ii) which include linear or branched compounds represented by HOOZ—X—ZOOH, where X includes aliphatic linkages, aromatic linkages, or mixtures thereof, of between two (2) carbons and twenty (20) carbons, and Z is carbon (C), phosphorous (P), sulfur (S). Suitable diacids include diacids of sugars, cycloalkyl dioic acids (e.g., 2,3-cyclohexyl diacid, 2,5-cyclohexyl 35 diacid, 2,6-cyclohexyl diacid), alkane dioic acids, alkene dioic acids, and aryl dioic acids. The one or more organic diacids (ii) may be selected from the group comprising for example, phthalic acid, isophthalic acid, terephthalic acid, trimellitic acid, tetrahydrophthalic acid, hexahydrophthalic acid, tetrachlorophthalic acid, oxalic acid, adipic acid, azelaic acid, sebacic acid, succinic acid, malic acid, glutaric acid, malonic acid, pimelic acid, suberic acid, 2,2-dimethylsuccinic acid, 3,3-dimethylglutaric acid, 2,2-dimethylglutaric acid, maleic acid, fumaric acid, itaconic acid, fatty acids (linolic, oleic and the like) and combinations thereof. The corresponding methyl esters or Anhydrides of the above acids, where they exist, can also be employed. In addition, certain materials which react in a manner similar to acids to form polyester polyol oligomers are also useful. Such materials include hydroxy acids such as tartaric acid and dimethylolpropionic acid. If a triol or higher hydric alcohol is used, a monocarboxylic acid, such as acetic acid, may be used in the preparation of the polyester polyol oligomer, and for some purposes, such as polyester polyol oligomer may be desirable. In some embodiments, the organic diacid is adipic acid.

The one or more organic diacids (ii) may comprise at least 5 wt. %, 10 wt. %, 15 wt. %, 20 wt. %, 25 wt. %, 30 wt. %, 35 wt. %, 40 wt. %, 45 wt. %, 50 wt. %, or 55 wt. % of the polyester reaction mixture. The at least one of one or more organic acids may comprise up to 10 wt. %, 15 wt. %, 20 wt. %, 25 wt. %, 30 wt. %, 35 wt. %, 40 wt. %, 45 wt. %, 50 wt. %, 55 wt. %, or 60 wt. % of the polyester reaction mixture.

The polyester reaction mixture includes diols (iii) having an OH functionality of 2 and molecular weights between about 62 g/mol 1000 g/mol. Examples of suitable difunctional alcohols include ethylene glycol, propylene glycol, 1,2-butylene glycol, 2,3-butylene glycol, 1,3-propanediol, 1,3-butanediol, 1,4-butanediol, 1,6-hexanediol, neopentylglycol, 1,2-ethylhexyldiol, 1,5-pentanediol, 1,10-decanediol, 1,3-cyclohexanedimethanol, 1,4-cyclohexanedimethanol (CHDM), and combinations thereof.

The one or more diols (iii) may comprise at least 5 wt. %, 10 wt. %, 15 wt. %, 20 wt. %, 25 wt. %, 30 wt. %, 35 wt. %, 40 wt. %, or 45 wt. % of the hydrophobic polyester polyol (a). The one or more diols (iii) may comprise up to 10 wt. %, 15 wt. %, 20 wt. %, 25 wt. %, 30 wt. %, 35 wt. %, 40 wt. %, 45 wt. %, or 50 wt. % of the hydrophobic polyester polyol.

In some embodiments, the hydrophobic polyester polyol is made by reacting adipic acid, hexanediol or butanol, 12-hydroxystearic acid, and a titanium catalyst.

The polyester reaction mixture may also include (iv) one or more polyols having a functionality of at least 3, and a molecular weight below about 400 g/mol, such as below 350, 300, 250, or 200 g/mol. Examples of suitable polyols include glycerin, trimethylolpropane, pentaerythritol, sorbitol, sucrose, and combinations thereof.

The one or more polyols (iv) may comprise between 0 and 5 wt. % of the hydrophobic polyester polyol. The one or more polyols (iv) may comprise at least 0.1 wt. %, 0. 2 wt. % 0.3 wt. %, 0.4 wt. %, 0.5 wt. %, 0. 6 wt. %, 0.7 wt. %, 0.8 wt. %, 0.9 wt. %, 1 wt. % 1.5 wt. %, 2 wt. %, 2.5 wt. %. 3 wt. %, 3.5 wt. $, 4 wt. %, or 4.5 wt. % of the hydrophobic polyester polyol (a). The one or more polyols (iv) may comprise up to 1 wt. % 1.5 wt. %, 2 wt. %, 2.5 wt. %. 3 wt. %, 3.5 wt. $, 4 wt. %, 4.5 wt. %, 5 wt. %, 7 wt. %, or 10 wt. % of the hydrophobic polyester polyol.

The polyester polyol may be formed by a polymerization reaction in the polyester reaction mixture. With respect to the method for performing the polymerization reaction, there is no particular limitation, and the polymerization reaction can be performed by using conventional methods known in the art. The polymerization reaction may be aided by a catalyst. Examples of the catalyst may include metals such as lithium, sodium, potassium, rubidium, cesium, magnesium, calcium, strontium, barium, titanium, zirconium, hafnium, cobalt, zinc, aluminum, germanium, tin, lead, antimony, arsenic, and cerium and compounds thereof. As the metallic compounds, oxides, hydroxides, salts, alkoxides, organic compounds, and the like may be mentioned. Of these catalysts, it is preferred to use titanium compounds such as titanium tetrabutoxide, titanium tetra-n-propoxide, titanium tetra-isopropoxide, titanium 2-ethyl hexanoate, and titanium acetylacetonate tin compounds such as di-n-butyltin dilaurate, di-n-butyltin oxide, and dibutyltin diacetate, lead compounds such as lead acetate and lead stearate. Exemplary titanium catalysts are available from Dorf Ketal under the tradename TYZOR® titanium acetylacetonates. Suitable commercially available products of that type include TYZOR® AA-105.

In addition to the polyester polyol, the first component may also include at least one chain extender. For purposes of the embodiments of the invention, a chain extender is a material having two isocyanate-reactive groups per molecule and an equivalent weight per isocyanate-reactive group of less than 400, daltons. All individual values of less than 400 daltons are included herein and disclosed herein; for example, the equivalent weight per isocyanate-reactive group can be less than 150, 200, 250, 300, 350, or 400 daltons. Between about 0.5 and about 15 weight % of the first component may include the at least one chain extender. All individual values and subranges between about 0.5 and about 15 weight % are included herein and disclosed herein; for example, the amount can be from a lower limit of about 0.5, 1, 2, 3, 4, 5, 7, 10, or 12 weight % to an upper limit of about 3, 4, 5, 7, 10, 12 or 15 weight %.

Representative chain extenders include ethylene glycol, diethylene glycol, 1,3-propane diol, 1,3- or 1,4-butanediol, dipropylene glycol, 1,2- and 2,3-butylene glycol, 1,6-hexanediol, neopentylglycol, tripropylene glycol, 1,2-ethylhexyldiol, ethylene diamine, 1,4-butylenediamine, 1,6-hexamethylenediamine, 1,5-pentanediol, 1,6-hexanediol, 1,3-cyclohexandiol, 1,4-cyclohexanediol; 1,3-cyclohexane dimethanol, 1,4-cyclohexane dimethanol, N-methylethanolamine, N-methyliso-propylamine, 4-aminocyclohexanol, 1,2-diaminotheane, 1,3-diaminopropane, hexylmethylene diamine, methylene bis(aminocyclohexane), isophorone diamine, 1,3- or 1,4-bis(aminomethyl)cyclohexane, diethylenetriamine, 3,5-diethyltoluene-2,4-diamine and 3,5-diethyltoluene-2,6-diamine, and mixtures or blends thereof. Suitable primary diamines include for example dimethylthiotoluenediamine (DMTDA) such as Ethacure 300 from Albermarle Corporation, diethyltoluenediamine (DETDA) such as Ethacure 100 Ethacure from Albermarle (a mixture of 3,5-diethyltoluene-2,4-diamine and 3,5-diethyltoluene-2,6-diamine), isophorone diamine (IPDA), and dimethylthiotoluenediamine (DMTDA).

The first component may further include at least one filler. The filler materials may be organic or inorganic, and may be in a form of individual, discrete particles. Inorganic filler materials include, for example, metal oxides, metal hydroxides, metal carbonates, metal sulfates, various kinds of clay, silica, alumina, powdered metals, glass microspheres, or void-containing particles. Specific examples of inorganic filler materials include calcium carbonate, barium sulfate, sodium carbonate, magnesium carbonate, magnesium sulfate, barium carbonate, kaolin, carbon, calcium oxide, magnesium oxide, magnesium hydroxide, aluminum oxide, aluminum hydroxide, and titanium dioxide. Inorganic filler materials also include, for example, those having higher aspect ratios than particles, such as talc, mica and wollastonite. Organic filler materials include, for example, latex particles, particles of thermoplastic elas-5 tomers, pulp powders, wood powders, cellulose derivatives, chitin, chitozan powder, powders of highly crystalline, high melting polymers, beads of highly crosslinked polymers, organosilicone powders, and powders or particles of super absorbent polymers, such as polyacrylic acid and the like. 10 Combinations of any of these filler materials may also be used. Between about 5 and about 50 weight % of first component may include the filler. All individual values and subranges between about 5 and about 50 parts per weight are included herein and disclosed herein; for example, the amount can be from a lower limit of about 5, 10, 15, 20, 25, 30, 35 weight % to an upper limit of about 20, 25, 30, 35, 40, 45, or 50 weight %.

The average filler particle sizes may from about 50 nanometers (nm) to about 3000 nm. All individual values and subranges between about 50 nm and about 3000 nm are included herein and disclosed herein; for example, the amount can be from a lower limit of about 50, 60, 70, 80, 90, 100, 200, 250, 300, 400, 500, 600, 750, 900, 1000, 1500, or 2000 nm to an upper limit of about 200, 250, 300, 400, 500, 600, 750, 900, 950, 1000, 1100, 1200, 1300, 1400, 1500, 2000, 2500, or 3000 nm. As used herein, particle sizes refer to the longest distance possible between two points on an individual particle; for example, for perfectly spherical particles, the particle size is equivalent to the spherical particles' diameter.

The at least one filler may include a first filler composition having an average particle size from about 1 nm to about 300 nm and a second filler composition having an average particle size from about 400 nm to about 1500 nm Embodiments encompass a first filler composition having an average particle size from about 50 nm to about 100 nm and a second filler composition having an average particle size from about 500 nm to about 900 nm.

The first component may also include at least one plasticizer. Suitable plasticizers are well-known in the art and abietates, adipates, alkyl sulfonates, azelates, benzoates, chlorinated paraffins, citrates, epoxides, glycol ethers and their esters, glutarates, hydrocarbon oils, isobutyrates, oleates, pentaerythritol derivatives, phosphates, phthalates, esters, polybutenes, ricinoleates, sebacates, sulfonamides, tri- and pyromellitates, biphenyl derivatives, stearates, difuran diesters, fluorine-containing plasticizers, hydroxybenzoic acid esters, isocyanate adducts, multi-ring aromatic compounds, natural product derivatives, nitriles, siloxane-based plasticizers, tar-based products, thioesters, seed oil or seed oil derivative and combinations thereof. Phthalates include alkylbenzyl phthalate (e.g., alkyl is octyl), dioctyl phthalate, dibutyl phthalate, diisononyl phthalate, and the like. The amount of plasticizer used is that amount sufficient to give the desired rheological properties and disperse the components in the sealant composition while maintaining desired mechanical properties of the final product. Between about 0.5 and about 30 weight % of the first component may include the at least one plasticizer. All individual values and subranges between about 0.5 and about 30 weight % are included herein and disclosed herein; for example, the amount can be from a lower limit of about 0.5, 1, 2, 3, 4, 5, 7, 10, 12, 15, or 20 weight % to an upper limit of about 3, 4, 5, 7, 10, 12, 15, 20, 25, or 30 weight %.

The first component may optionally include at least one thixotrope such as calcinated clay or fumed silica which has been surface modified with polydimethylsiloxane. Between about 0.5 and about 15 weight % of the first component may include the at least one thixotrope. All individual values and subranges between about 0.5 and about 15 weight % are included herein and disclosed herein; for example, the amount can be from a lower limit of about 0.5, 1, 2, 3, 4, 5, 7, 10, or 12 weight % to an upper limit of about 3, 4, 5, 7, 10, 12 or 15 weight %.

The first component is reacted with a second component which includes at least one isocyanate. Suitable isocyanates include a wide variety of organic mono- and polyisocyanates. Suitable monoisocyanates include benzyl isocyanate, toluene isocyanate, phenyl isocyanate and alkyl isocyanates in which the alkyl group contains from 1 to 12 carbon atoms. Suitable polyisocyanates include aromatic, cycloaliphatic and aliphatic isocyanates. Exemplary polyisocyanates include m-phenylene diisocyanate, toluene-2-4-diisocyanate, toluene-2-6-diisocyanate, isophorone diisocyanate, 1,3- and/or 1,4-bis(isocyanatomethyl)cyclohexane (including cis- or trans-isomers of either), hexamethylene-1,6-diisocyanate, tetramethylene-1,4-diisocyanate, cyclohexane-1,4-diisocyanate, hexahydrotoluene diisocyanate, methylene bis(cyclohexaneisocyanate) ($H_{12}$MDI), naphthylene-1,5-diisocyanate, methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"'-triphenyl methane triisocyanate, a polymethylene polyphenylisocyanate (PMDI), toluene-2,4,6-triisocyanate and 4,4'-dimethyldiphenylmethane-2,2',5,5'-tetraisocyanate. In some embodiments, the polyisocyanate is diphenylmethane-4,4'-diisocyanate, diphenylmethane-2,4'-diisocyanate, PMDI, toluene-2,4-diisocyanate, toluene-2,6-diisocyanate or mixtures thereof. Diphenylmethane-4,4'-methylene diphenyl isocyanate, diphenylmethane-2,4'-diisocyanate and mixtures thereof are generically referred to as MDI, and all may be used. Toluene-2,4-diisocyanate, toluene-2,6-diisocyanate and mixtures thereof are generically referred to as TDI, and all may be used. In one embodiment, a 50 percent 4,4' MDI, 50 percent 2,4' MDI, such as ISONATE 50 OP available from The Dow Chemical Company, is used in combination with a polymeric MDI, such as PAPI 27 available from The Dow Chemical Company.

Derivatives of any of the foregoing isocyanate groups that contain biuret, urea, carbodiimide, allophonate and/or isocyanurate groups may also be used. These derivatives often have increased isocyanate functionalities and are desirably used when a more highly crosslinked product is desired. The first component and the second component may be reacted at isocyanate indexes from 60 to 150. All individual values and subranges between about 60 and about 150 are included herein and disclosed herein; for example, the amount can be from a lower limit of about 60, 70, 80, 90, or 100, to an upper limit of about 90, 100, 125, or 150.

Furthermore, the first component and the second component may be reacted in the presence of at least one adhesion promoter. The adhesion promoter may be introduced as a third separate component. Alternatively, the adhesion promoter may be included as part of the first component and/or as part of the second component. The adhesion promoter level in the sealant compositions may in the range of 0.5 weight % to 10 weight % of the total weight of the materials used in the polyurethane sealant system. All individual values and subranges between about 0.5 weight % and about 10 weight % are included herein and disclosed herein; for example, the amount can be from a lower limit of about 0.5, 1, 2, 3, 4, or 5, to an upper limit of about 2, 3, 5, 6, 7, 8, 9, or 10 weight %.

The at least one adhesion promoter may encompass at least the reaction product of at least one secondary aminoalkoxy silane and at least one second isocyanate, such that the reaction product has an average of at least one silane group and at least one isocyanate group per molecule.

The at least one adhesion promoter may be a reaction product of a secondary amino- or mercaptoalkoxy silane and a polyisocyanate, having an average of at least one silane group and at least one isocyanate group per molecule (hereinafter "adduct"), such as for example described in U.S. Pat. No. 5,623,044. Embodiments encompass adducts having at least 1.5 isocyanate groups and at least one silane group per molecule, and adducts having at least two isocyanate groups and at least one silane group per molecule.

Useful adhesion promoters also include N-2-aminoethyl-3-aminopropyltriethoxysilane, gamma-aminopropyltriethoxysilane, gamma-aminopropyltrimethoxysilane, aminopropyltrimethoxysilane, bis-gamma-trimethoxysilypropyl) amine, N-phenyl-gamma-aminopropyltrimethoxysilane, triaminofunctionaltrimethoxysilane and gamma-aminopropyl-methyldiethoxysilane.

In addition to the above described components, the compositions may also include other ingredients such as carbon black, carbon black pastes, or other colourants, preservatives, antioxidants, and catalysts.

Catalysts typically used in the two component sealant compositions include those known to be useful for facilitating polyurethane production. The catalysts include metal and non-metal catalysts. Examples of the metal portion of the metal catalysts useful in the present invention include tin, titanium, zirconium, lead, iron cobalt, antimony, manganese, bismuth and zinc compounds. Suitable tin compounds include dimethyldineodecanoatetin, dibutyltindilaurate, dibutyltindiacetate, dibutyltindimethoxide, tinoctoate, isobutyltintriceroate, dibutyltinoxide, solubilized dibutyl tin oxide, dibutyltin bis diisooctylphthalate, bis-tripropoxysilyl dioctyltin, dibutyltin bis-acetylacetone, silylated dibutyltin dioxide, carbomethoxyphenyl tin tris-uberate, isobutyltin triceroate, dimethyltin dibutyrate, dimethyltin di-neodecanoate, triethyltin tartarate, dibutyltin dibenzoate, tin oleate, tin naphthenate, butyltintri-2-ethylhexylhexoate, and tinbutyrate, and the like.

The sealant compositions embodied herein may be prepared by procedures well known in the art, e.g., melt blending, extrusion blending, solution blending, dry mixing, etc., in or out of the presence of moisture, to provide a substantially homogeneous mixture. The sealant compositions embodied herein are used in the same manner as known sealants for IG units.

Insulated glass (IG) units are well known, and FIG. 1a of WO 2009/060199 is illustrative. The IG unit is of known and conventional construction, and it includes two panes maintained in a parallel, spaced-apart relationship by one or more spacer bars, thus forming a cavity between the panes. A primary gas sealant is present between each spacer bar and each pane, adjacent to the cavity. A secondary gas sealant is present between each pane and each spacer bar, not adjacent to the cavity. The sealant composition of the embodiments presented above can be either or both the primary and secondary gas sealants although it is typically the secondary sealant. The cavity between the panes is filled with an insulating gas or gases such as air, carbon dioxide, sulfur hexafluoride, nitrogen, argon, krypton, xenon, and the like. A glazing bead is typically positioned between the panes and the window frame. The panes can be fabricated from any of a variety of materials such as glass, e.g., clear float glass, annealed glass, tempered glass, solar glass, tinted glass and low energy glass; acrylic resin; polycarbonate resin; and the like.

The cured sealant compositions embodied herein provides improved gas barrier characteristics and moisture leakage characteristics relative to known and conventional gas sealants. As a result, the cured sealant composition provides for longer in-service performance of insulated glass units of all manner of construction. Furthermore, the sealant compositions embodied herein provides improved weathering properties relative to known and conventional gas sealants. For, example the sealant compositions embodied herein have better resistance to UV light and humidity.

Although the embodiments of the sealant compositions can serve as the primary gas sealant, typically the primary gas sealant comprises any one of a number of polymeric materials known in the art as useful for serving as a primary sealant including, but not limited to, rubber base materials such as polyisobutylene, butyl rubber, polysulfide, EPDM rubber, nitrile rubber, and the like. Other useful materials include, polyisobutylene/polyisoprene copolymers, polyisobutylene polymers, brominated olefin polymers, copolymers of polyisobutylene and para-methylstyrene, copolymers of polyisobutylene and brominated para-methylstyrene, butyl rubber-copolymer of isobutylene and isoprene, ethylene-propylene polymers, polysulfide polymers, polyurethane polymers, styrene butadiene polymers, and the like. In addition, the sealant composition of this invention can be used as the primary gas sealant.

The primary gas sealant member can be fabricated from a material such as polyisobutylene which has very good sealing properties. The glazing bead is a sealant that is sometimes referred to as the glazing bedding and can be provided in the form of a silicone or butyl rubber. Desiccant can be included in the continuous spacer to remove moisture from the insulating gas occupied cavity or space between the panes. Useful desiccants are those that do not adsorb the insulating gas/gases filling the interior of the insulated glass unit.

The sealants encompassed by the embodiments of the invention may have enhanced weatherability and gas retention properties while at the same time maintaining the sealants' physical, structural, and mechanical properties. Embodiments of the sealants, generally maintain their Tensile strength and Elongation at break after exposure to water and simulated humidity and sunlight.

EXAMPLES

The following examples are provided to illustrate the embodiments of the invention, but are not intended to limit the scope thereof. All parts and percentages are by weight unless otherwise indicated.

The following materials were used:
Adipic acid Available from Sigma-Aldrich Co.
1,6-Hexanediol Available from Sigma-Aldrich Co.
1,4-Butanediol Available from Sigma-Aldrich Co.
12-Hydroxystearicacid Available from Royal Castor Products.
Glycerin Available from Sigma-Aldrich Co.
1,4-Butanediol Available from International Specialty Products.
2-Ethyl-1,3-hexanediol Available from Sigma-Aldrich Co.
VORANOL 220-530 An aniline initiated polyether polyol having a functionality of 2, number average molecular weight of 212, and an OH number of 530.

POLY BD R-45HTLO A 2800 molecular weight liquid hydroxyl terminated polymer of butadiene having an OH number of 47.1. Available from Sartomer Company.

SANTICIZER 278 A plasticizer of a high molecular weight Benzyl Phthalate, available from Ferro Corporation.

TXIB 2,2,4-Trimethyl-1,3-pentanediol diisobutyrate, a non-phthalate plasticizer available from Eastman Chemical Company.

SUPER-PFLEX 200 pcc A precipitated calcium carbonate filler (average particle size of 0.7 microns) which is surface treated with stearic acid for a surface treatment level of 2%, available from Minerals Technologies Inc.

ULTRA-PFLEX A surface treated precipitated calcium carbonate filler (average particle size of 0.07 microns) available from Minerals Technologies Inc.

HYDROCARB 95T A precipitated calcium carbonate filler (average particle size of 0.7 microns) which is surface treated with stearic acid for a surface treatment level of 2%, available from Omya AG.

SILQUEST A-187 An epoxy functional silane available from Momentive Performance Materials Inc.

CAB-O-SIL TS-720 Fumed silica available from Cabot Corp.

TYZOR AA-105 Titanium catalyst available from Dorf Ketal.

FOMREZ UL-28 A dimethyldineodecanoatetin catalyst available Momentive Performance Materials Inc.

ISONATE* 143L A polycarbodiimide-modified diphenylmethane diisocyanate, available from The Dow Chemical Company.

Tensile strength and Elongation at break are measured according to ASTM standard test D1708.

Water absorption is measured according to internally developed Dow method. The polyurethane plaques are cut into dog-bone shapes and weighed ($W_0$). The polymer samples are then immersed in deionized water at 100° C. for 1 hour. The samples are then dried with a tissue and weighed to obtain weight $W_1$. The water absorption is calculated using the equation:

Water uptake=$((W_1-W_0)/W_0) \times 100\%$

Additionally, Tensile strength and Elongation were measured on the films after water absorption measurements.

Weatherability is determined by measuring the Tensile strength and Elongation of samples before and after the films are aged for 30 days at 50° C. using alternate cycles of UV exposure followed by 100% relative humidity for 4 hours each in a QUV Accelerated Weathering Tester from Q Lab. The Weathering Tester uses fluorescent UV lamps to reproduce sunlight. The lamps used are UVA-340 which simulates sunlight in the region from 365 nm down to the solar cut-on of 295 nm. Its peak emission is at 340 nm. The samples are mounted on a QUV specimen holder. The surface of the sample exposed is in the standard sample plane, 50 mm from the lamps. Tensile strength and Elongation retention rates are calculated by dividing the weathered Tensile strength and Elongation results by the original Tensile strength and Elongation and multiplying by 100.

Oxygen transmission is measured using a MOCON Oxtran2/21 Instrument. Standards that apply to this instrument include ASTM D-3985, ASTM F-1927, DIN 53380, JIS K-7126 and ISO CD 15105-2. The thickness of the films used in this testing ranged from 15-20 μm. Flat film samples are clamped into the diffusion cell, which is then purged of residual oxygen using an oxygen-free carrier gas. The carrier gas is routed to the sensor until a stable zero has been established. Pure (99.9%) oxygen is then introduced into the outside chamber of the diffusion cell. Molecules of oxygen diffusing through the film to the inside chamber are conveyed to the sensor by the carrier gas. As the sensor generates an electrical current directly proportional to the amount of oxygen in the carrier gas, the computer monitors the increase in current across a load resistor. The computer reports that value on screen as the oxygen transmission rate.

Moisture Vapor Transmission Rate (MVTR) is measured on a MOCON Permatran-W 3/33 water Vapor permeability instruments. The standards that apply to this instrument include ASTM F-1249, TAPPI T557, and JIS K-7129. The thickness of the films used in this testing ranged from 15-20 μm. Flat film samples are clamped into the diffusion cell, which is then purged of residual water vapor using moisture-free carrier gas. This moisture-free carrier gas is routed to the sensor until a stable MVTR has been established. Molecules of water diffusing through the film to the inside chamber are conveyed to the sensor by the carrier gas.

Lap shear measurements are performed by applying a bead of uncured sealant compositions approximately 6.3 mm wide by 8 mm high along the width of a glass plate (1"×6"×¼"). A stainless steel substrate (1"×4"×1/32") is immediately placed on the sealant such that 2" inches of the glass plate and the stainless steel substrate overlap. The sample is allowed to cure at 23° C. and 50 percent relative humidity for 7 days. The sample is then separated by pulling in a plane parallel to the bead with an Instron machine at a rate of 1 inch/minute (2.5 cm/min).

Polyols 1-3

Polyols 1-3 are made as follows: Adipic acid 1,6-hexanediol or 1,4-butanediol, 12-hydroxylstearicacid and glycerin are added into a 4 neck-round bottom flask. The amounts used are given in Table 1. The flask is placed on a heating mantle, and a mechanical stirrer is set up in the center neck. A nitrogen gas needle is inserted through a rubber septum with the flow rate at 0.1 L/min. In order to remove water by-product with minimizing raw material losses, a separation column (vacuum jacketed column) is utilized. The water by-product is collected using a distilling head. The reaction temperature is controlled by a temperature controller which is connected with a thermocouple and a heating mantle. The reaction temperature is set at 210° C. The raw materials are melted before stirring is engaged at 300 rpm. Once the reaction temperature is in the range of 180 to 200° C., catalyst TYZOR AA-105 is added at 50 parts per million. After catalyst addition, both the stirring and the nitrogen gas stripping rate are increased up to 600 rpm and 0.7 L/min, respectively, until the reaction is completed. The extent of reaction is monitored by measuring acidity, and it is regarded that the reaction is completed when the acidity become less than 2 mg KOH/g.

TABLE 1

|  | Polyol 1 | Polyol 2 | Polyol 3 |
| --- | --- | --- | --- |
| Adipic acid (g) | 33.48 | 38 | 38.8 |
| 1,6-Hexanediol (g) | 30.54 | — | — |
| 1,4-Butanediol (g) | — | 26.02 | 24.6 |
| 12-hydroxylstearicacid (g) | 34.55 | 34.55 | 34.6 |
| Glycerin (g) | 1.43 | 1.43 | 2 |
| Total | 100 | 100 | 100 |
| OH # Target | 56 | 56 | 37 |
| HEW | 1000 | 1000 | 1500 |

Examples 1-5 and Comparative Example A

Examples 1-5 are polyurethane polymer systems made by mixing one of Polyols 1-3 (Examples 1-5) or POLY BD Resin R-45HTLO (Comparative Example A) with 1,4-butanediol (Comparative Example A and Examples 1-3), 2-Ethyl-1,3-hexanediol (Example 4), or VORANOL 220-530 (Example 5) for 45 seconds at 2350 RPM. The isocyanate (ISONATE 143L) is then added to the mixture which is mixed for 20 seconds at 2350 RPM. The catalyst (FOMREZ UL-28) is added and the mixture is mixed one last time for 20 second at 2350 RPM. The amounts used and are given in Table 2. The mixture is then place between two sheets of Teflon with a 40 mm metal picture frame spacer to set the thickness. This system is then placed between two metal plates and placed in a hydraulic press and pressed under 30,000 psi for a minimum of 30 minutes.

TABLE 2

|  | Comparative Example A | Example 1 (Polyol 1 Resin) | Example 2 (Polyol 2 Resin) | Example 3 (Polyol 3 Resin) | Example 4 (Polyol 3 Resin) | Example 5 (Polyol 3 Resin) |
| --- | --- | --- | --- | --- | --- | --- |
| Polyol 1 | — | 100 | — | — | — | — |
| Polyol 2 | — | — | 100 | — | — | — |
| Polyol 3 | — | — | — | 70 | 70 | 70 |
| POLY BD Resin R-45HTLO | 100 | — | — | — | — | — |
| 1,4-butanediol | 3 | 3.5 | 3.5 | 1.74 | — | — |
| 2-Ethyl-1,3-hexanediol | — | — | — | — | 2.86 | — |
| VORANOL 220-530 | — | — | — | — | — | 4.09 |
| FOMREZ UL-28 | 0.04 | 0.04 | 0.04 | 0.03 | 0.03 | 0.03 |
| ISONATE 143L | 17.15 | 27.93 | 27.93 | 12.65 | 12.65 | 12.65 |
| Water absorption, % | 0.045 | 0.76 | 0.67 | 0.6 | 0.58 | 0.53 |
| Tensile strength, psi | 248 | 429 | 746 | 529 | 432 | 534 |
| Tensile strength after water absorption, psi | 176 | 315 | 600 | 513 | 347 | 616 |
| Tensile strength, psi after Weatherability exposure, psi | 95 | 160 | Not measured | Not measured | Not measured | Not measured |
| Tensile strength retention after Weatherability exposure, % | 38 | 37 | — | — | — | — |
| Elongation, % | 481 | 643 | 675 | 391 | 451 | 524 |
| Elongation after water absorption, % | 347 | 725 | 732 | 396 | 391 | 547 |
| Elongation after Weatherability exposure, % | 50 | 295 | Not measured | Not measured | Not measured | Not measured |
| Elongation retention after Weatherability exposure, % | 10 | 45 | — | — | — | — |
| $O_2$ transmission, cc/(100 in$^2$ day) | 212 | Not measured | 72 | Not measured | Not measured | Not measured |
| Moisture Vapor Transmission, g/(100 in$^2$ day) | 0.74 | Not measured | 2.2 | Not measured | Not measured | Not measured |

It can be seen that for the examples made with polyester polyols containing 12-hydroxystearic acid and adipic acid, lead to improved mechanical properties (tensile strength and elongation), more favorable $O_2$ transmission rates, and improved hydrolytic stability. The examples made with polyester polyols containing 12-hydroxystearic acid and adipic acid also displays acceptable Moisture Vapor Transmission, better than those obtained with using a polysulfide system which typically have a Moisture Vapor Transmission rate of about 5 g/(100 in$^2$ day).

Examples 6-8 and Comparative Example B

Examples 6-8 are polyurethane polymer systems made by mixing one of Polyols 1-3 (Examples 6-8) or POLY BD Resin R-45HTLO (Comparative Example B) with chain extender (1,4-butanediol), plasticizer (TXIB, SANTICIZER 278), and silane (SILQUEST A-187) for 45 seconds at 2350 RPM. To this solution the Calcium carbonate (SUPER-PFLEX 200 pee, HYDROCARB 95T, and/or ULTRA-PFLEX) is added and mixed for an additional 45 seconds at 2350 RPM. The rheology modifier (CAB-O-SIL TS-720) is then added and mixed again for 45 seconds at 2350 RPM. The isocyanate (ISONATE 143L) is then added to the mixture and mixed for 20 seconds at 2350 RPM The catalyst (FOMREZ UL-28) is added and the mixture is mixed one last time for 20 second at 2350 RPM. The mixture is then place between to sheets of Teflon with a 40 mm metal picture frame spacer to set the thickness. This system is placed between to metal plates and place in a hydraulic press and pressed with 30,000 psi for a minimum of 30 minutes. Amounts and results are given in Table 3.

TABLE 3

|  | Comparative Example B | Example 6 | Example 7 | Example 8 |
| --- | --- | --- | --- | --- |
| Polyol 1 (g) | — | 100 | — | — |
| Polyol 2 (g) | — | — | 100 | — |
| Polyol 3 (g) | — | — | — | 100 |
| POLY BD Resin R-45HTLO (g) | 100 | — | — | — |
| 1,4-butanediol (g) | 3 | 3.5 | 3.5 | 2.5 |
| TXIB | — | — | 36 | 36 |
| SANCTICIZER-278 (g) | 40 | 36 | — | — |
| SILQUEST A-187 (g) | 2 | 2 | 2 | 2 |
| HYDROCARB 95T | — | — | — | 182 |
| SUPER-PFLEX 200 (g) | 182 | 182 | 182 | — |
| ULTRA-PFLEX | 86 | 86 | 86 | 86 |
| CAB-O-SIL TS-720 | 3 | 3 | — | — |
| FOMREZ UL-28 (g) | 0.04 | 0.04 | 0.04 | 0.04 |
| ISONATE 143L (g) | 17.15 | 26.5 | 26.5 | 18.07 |
| Tensile strength, psi | 261 | 480 | 300 | 250 |
| Elongation, % | 549 | 790 | 590 | 320 |
| Lap shear, psi | 72 | 172 | 184 | Not measured |

It can be seen that for two of the examples made with polyester polyols containing 12-hydroxystearic acid and adipic acid, lead to improved mechanical properties (tensile strength and elongation) and improved adhesion relative to Comparative Example B.

While the foregoing is directed to embodiments of the present invention, other and further embodiments of the invention may be devised without departing from the basic scope thereof, and the scope thereof is determined by the claims that follow.

The invention claimed is:

1. A polyurethane-based sealant comprising a reaction product of a reaction system, the reaction system comprising:
   at least one isocyanate;
   at least one chain extender having two isocyanate-reactive groups per molecule and an equivalent weight per isocyanate-reactive group of less than 400; and
   at least one polyester polyol, the polyester polyol being a reaction product of a polyester reaction mixture consisting essentially of:
      one or more hydrophobic monomers comprising one or more hydroxyl stearic acids or esters thereof, or hydroxymethylated fatty acids or esters thereof;
      one or more organic diacids or methyl esters thereof comprising linear or branched compounds represented by HOOZ—X—ZOOH, where X indicates aliphatic linkages, aromatic linkages, or mixtures thereof, of between 2 carbons and 20 carbons, and Z is selected from carbon, phosphorous, or sulfur;
      one or more diols having a molecular weight between about 62 g/mol and about 1000 g/mol, and selected from ethylene glycol, propylene glycol, 1,2-butylene glycol, 2,3-butylene glycol, 1,3-propanediol, 1,3-butanediol, 1,4-butanediol, 1,6-hexanediol, neopentylglycol, 1,2-ethylhexyldiol, 1,5-pentanediol, 1,10-decanediol, 1,3-cyclohexanedimethanol, 1,4-cyclohexanedimethanol (CHDM), or combinations thereof; and
      one or more polyols having a functionality of at least 3 and a molecular weight below about 400 g/mol.

2. The polyurethane-based sealant of claim 1, wherein the reaction system further comprises at least one filler, wherein the at least one filler is at least one of barium sulfate ($BaSO_4$), aluminum oxide ($Al_2O_3$), aluminum hydroxide ($Al(OH)_3$), magnesium hydroxide ($Mg(OH)_2$) calcium carbonate ($CaCO_3$), mica, and talc.

3. The polyurethane-based sealant of claim 2, wherein the reaction system further comprises at least one plasticizer.

4. The polyurethane-based sealant of claim 3, wherein the reaction system further comprises at least one adhesion promoter.

5. The polyurethane-based sealant of claim 4, wherein the reaction system further comprises at least one catalyst.

6. The polyurethane-based sealant of claim 1, wherein the one or more organic diacids are selected from phthalic acid, isophthalic acid, terephthalic acid, trimellitic acid, tetrahydrophthalic acid, hexahydrophthalic acid, tetrachlorophthalic acid, oxalic acid, adipic acid, azelaic acid, sebacic acid, succinic acid, malic acid, glutaric acid, malonic acid, pimelic acid, suberic acid, 2,2-dimethylsuccinic acid, 3,3-dimethylglutaric acid, 2,2-dimethylglutaric acid, maleic acid, fumaric acid, itaconic acid, fatty acids, or combinations thereof.

7. The polyurethane-based sealant of claim 1, wherein the one or more organic diacids comprises adipic acid.

8. The polyurethane-based sealant of claim 7, wherein the one or more hydrophobic monomers comprises 12-hydroxystearic acid.

9. The polyurethane-based sealant of claim 1, wherein the one or more polyols having a functionality of at least 3 and a molecular weight below about 400 g/mol comprises glycerin.

10. An insulated unit, comprising:
    a first surface;
    the polyurethane-based sealant of claim 1 disposed on at least portions of the first surface; and
    a second surface disposed on the polyurethane-based sealant.

11. A method of forming the polyurethane-based sealant of claim 1, the method comprising reacting at least the at least one isocyanate, the at least one chain extender, and the at least one polyester polyol.

* * * * *